No. 695,270. Patented Mar. 11, 1902.
G. M. BERINGER.
VACCINE SHIELD.
(Application filed Dec. 5, 1901.)
(No Model.)
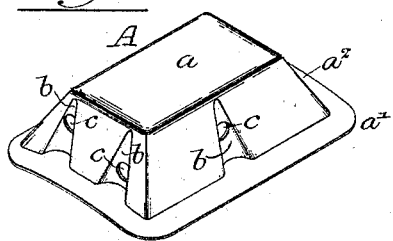
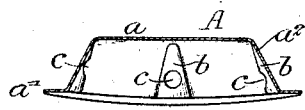 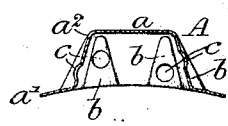
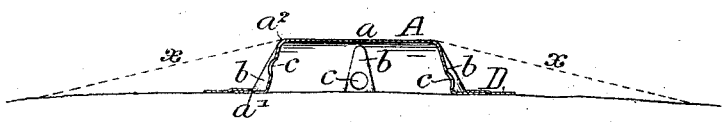
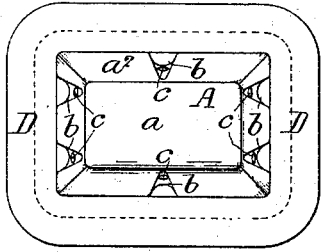
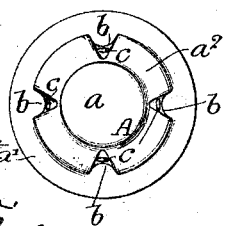
Inventor:
George M. Beringer;
by his Attorneys;
Witnesses:

UNITED STATES PATENT OFFICE.

GEORGE M. BERINGER, OF CAMDEN, NEW JERSEY.

VACCINE-SHIELD.

SPECIFICATION forming part of Letters Patent No. 695,270, dated March 11, 1902.

Application filed December 5, 1901. Serial No. 84,763. (No model.)

*To all whom it may concern:*

Be it known that I, GEORGE M. BERINGER, a citizen of the United States, and a resident of Camden, New Jersey, have invented certain Improvements in Vaccine-Shields, of which the following is a specification.

The object of my invention is to provide a shield especially adapted for the protection of wounds caused by vaccination, which will be light and substantial and which will be thoroughly ventilated, the ventilating-openings being out of contact with any wearing-apparel, so as to give free ventilation and prevent the abrasion of the garment in contact with the shield, which at present causes undue inflammation by the lint accumulating on the surface of the wound.

My invention, which is especially designed as a vaccine-shield, can be used to protect other wounds or eruptions on the skin without departing from the invention.

In the accompanying drawings, Figure 1 is a perspective view of my improved shield. Fig. 2 is a longitudinal sectional view. Fig. 3 is a transverse sectional view. Fig. 4 is a longitudinal sectional view showing the washer of adhesive material by which the shield is attached in position. Fig. 5 is a plan view of Fig. 4, and Figs. 6 and 7 are views of modifications of my invention.

A is the body of the shield, which is preferably made of transparent celluloid. $a$ is the dome of the shield, and $a'$ is the base-flange, which in the present instance extends entirely around the shield, but may be only at each end in some cases. The inclined walls $a^2$ extend from the base-flange to the dome, as shown in Fig. 1.

I form corrugations $b$ in the walls at intervals, as shown in Fig. 1, which stiffen the walls, so that the shield can be made of very light material and yet will prevent the crown breaking down by any ordinary pressure. These corrugations preferably do not extend into the surface $a'$, so that the surface is smooth, and I preferably round the corners at the junction of the side walls and the crown, so that when a garment rests upon the shield, lint will not be rubbed from it.

In order to thoroughly ventilate the shield, I provide openings $c$ within the corrugations, and I preferably form some of these openings near the base of the shield, while others I form near the crown. Thus the openings are protected entirely from the garment, and the sharp edge around the openings cannot come in contact with the garment and cause the abrasion which is so objectionable in certain shields now upon the market.

In some instances I may perforate the walls of the shield on the inclined sides, as shown in Fig. 7, instead of in the corrugations; but I prefer, where practicable, to perforate the shield only in the corrugations.

Any means may be used to attach the shield A in position, and in Figs. 4 and 5 I have shown a washer D, of adhesive plaster, which rests upon the flange $a'$ and extends beyond it sufficiently to properly adhere to the flesh.

In Figs. 1 to 5 I have shown the shield oblong in shape, while in Fig. 6 I have shown a circular shield. Either one may be used without departing from my invention.

When the garment is placed over the shield, as shown, for instance, by dotted line $x$, Fig. 4, there will be an air-space all around the shield with which the space within the shield can freely communicate through the perforations $c$, so that the wound is thoroughly ventilated, and there is no liability of the openings being clogged by the garment. Furthermore, the portion of the shield upon which the garment rests is perfectly smooth, so as to prevent the abrasion of the garment and consequent linting of the material.

I have shown the corrugations $c$ tapered, being larger at the base than at the crown, as this form is preferable, owing to the inclination of the side walls; but the corrugations may be of an even width throughout, if desired, and more or less inclination may be given to the side walls.

While I prefer to make my shield of transparent celluloid, it may be made of metal or other material without departing from my invention.

I claim as my invention—

1. As a new article of manufacture, a shield for protecting scarified surfaces or other wounds, said shield being shaped to form a crown, and having a base-flange, the side walls of the shield being corrugated, with openings within the corrugations, substantially as described.

2. As a new article of manufacture, a shield for protecting scarified surfaces or other wounds, having a crown and a base-flange and inclined side walls, with corrugations in the side walls only, said corrugations terminating below the crown, substantially as described.

3. As a new article of manufacture, a shield having a base-flange and a crown, inclined side walls having tapered corrugations extending from the base-flange to a point below the crown and openings in the corrugations, substantially as described.

4. As a new article of manufacture, a shield made of celluloid or similar material, having a crown and a base-flange, said base-flange extending entirely around the shield and inclined side walls, with corrugations in the side walls only and perforations within the corrugations, the edge of the crown being rounded so as to provide a smooth surface, substantially as described.

In testimony whereof I have signed my name to this specification in the presence of two subscribing witnesses.

GEORGE M. BERINGER.

Witnesses:
    WILL. A. BARR,
    JOS. H. KLEIN.